US008024205B2

(12) United States Patent
Bresch et al.

(10) Patent No.: US 8,024,205 B2
(45) Date of Patent: Sep. 20, 2011

(54) SYSTEM AND METHOD FOR CALCULATING DAMAGE AS A RESULT OF NATURAL CATASTROPHES

(75) Inventors: David Bresch, Zürich (CH); Markus Spühler, Brüttisellen (CH)

(73) Assignee: Swiss Reinsurance Company, Zürich (CH)

( * ) Notice: Subject to any disclaimer, the term of this patent is extended or adjusted under 35 U.S.C. 154(b) by 676 days.

(21) Appl. No.: 11/963,121

(22) Filed: Dec. 21, 2007

(65) Prior Publication Data

US 2008/0154652 A1    Jun. 26, 2008

(30) Foreign Application Priority Data

Dec. 21, 2006   (EP) .................................. 06405538

(51) Int. Cl.
*G06Q 40/00*   (2006.01)
(52) U.S. Cl. .......................................... 705/4; 705/14.5
(58) Field of Classification Search .................... 705/35, 705/4
See application file for complete search history.

(56) References Cited

U.S. PATENT DOCUMENTS

| 4,325,120 | A | * | 4/1982 | Colley et al. ................... 711/202 |
| 5,212,777 | A | | 5/1993 | Gove et al. |
| 2002/0143586 | A1 | * | 10/2002 | Kodama et al. ................... 705/4 |
| 2005/0160239 | A1 | | 7/2005 | Johns |

* cited by examiner

*Primary Examiner* — Ojo O Oyebisi
(74) *Attorney, Agent, or Firm* — Oblon, Spivak, McClelland, Maier & Neustadt, L.L.P.

(57) ABSTRACT

To calculate expected damage as a result of natural catastrophe events (5) on a multiplicity of insured objects, a plurality of processor units (31, 31', 31"), are respectively provided with different instruction data comprising details related to at least one portion of the insured objects and their association with a risk type and a geographical risk area for a risk group (L2). The processor units are controlled such that they respectively calculate elemental damage details for the expected damage as a result of one of the natural catastrophe events on the basis of the instruction data provided for them and a damage sensitivity function determined by virtue of the association of the insured objects with a risk type and a geographical risk area. The damage sensitivity functions can be determined and made available directly in the processor units, and the total computation time can be reduced.

18 Claims, 3 Drawing Sheets

SYSTEM AND METHOD FOR CALCULATING DAMAGE AS A RESULT OF NATURAL CATASTROPHES

TECHNICAL FIELD

The present invention relates to a system and a method for calculating damage as a result of natural catastrophes. In particular, the present invention relates to a computer-based system and a computer-implemented method for calculating expected damage as a result of natural catastrophe events on a multiplicity of insured objects in a portfolio.

PRIOR ART

Insurance portfolios for insuring objects for damage caused by natural catastrophes such as storms, floods or earthquakes comprise, particularly at reinsurance level, a multiplicity, for example, tens of thousands or hundreds of thousands, of geographically distributed insurance objects such as single-family houses, multiple-family houses and commercial buildings and/or their contents. Historical information about natural catastrophe events in the past is looked at to determine the damage which is expected to occur in the future on insurance objects as a result of natural catastrophe events. In addition, data records containing simulated natural catastrophe events are also produced and are used to determine the expected damage on the insurance objects. For each historical or simulated natural catastrophe event, it is possible to indicate an event level or event intensity, an event frequency and/or an event probability. The greater the number of historical and/or simulated natural catastrophe events considered or the length of the period taken into account, the more accurately and reliably it is possible to determine the expected damage. The same also applies to the resolution of the insurance objects. The greater the geographical resolution of the insurance objects, the more accurately it is possible to take account of different damage sensitivities for the insurance objects and hence the expected damage. However, to determine expected damage on a portfolio containing hundreds of thousands of insurance objects, containing thousands of different damage sensitivity functions for the insured objects and containing natural catastrophe events over a long period of several hundred or thousand years, dozens of hours of computation time need to be employed, depending on the computing power of the computer taken into account. Although it may be worth employing such long computation time in individual cases, it is not very efficient when employed on a daily basis to estimate insurance portfolios and to calculate insurance premiums on the basis thereof, and is unsuitable for calculating a large number of insurance portfolios.

The patent application US 2005/0160239 describes a multiprocessor system having master and slave processors which are connected to one another by means of individual processor buses and a central switching unit so that it is possible to afford coherency among the caches in the individual processors. In addition, the switching unit comprises a process apparatus which creates a serial order for all instructions from the processors.

U.S. Pat. No. 5,212,777 describes a multiprocessor system in which all processors are connected to various memory units by means of a crossbar switching unit. The entire system, including the processors, memory units and crossbar switching unit, are integrated on a single silicon chip. Each processor is configured to process the same instruction or different instructions in different modes of operation at the same time. In addition, the multiprocessor system from U.S. Pat. No. 5,212,777 comprises a centralized register which determines the current mode of operation using appropriately set bits.

ILLUSTRATION OF THE INVENTION

It is an object of the present invention to propose a computer-based system and a computer-implemented method for calculating expected damage as a result of natural catastrophe events on a multiplicity of insured objects in a portfolio, which system and which method allow efficient calculation of the expected damage on hundreds of thousands of insured objects, taking into account natural catastrophe events over several hundred years, the computation time being reduced in comparison with conventional systems and methods for the same level of computation accuracy.

In line with the present invention, these aims are achieved, particularly by the elements in the independent claims. Further advantageous embodiments also emerge from the dependent claims and the description.

The present invention achieves the aforementioned aims particularly by virtue of expected damage as a result of natural catastrophe events on a multiplicity of insured objects in a portfolio being calculated by associating the insured objects with a risk type and a geographical risk area for a risk group, by virtue of various instruction data being provided for a respective one of a plurality of processor units, which instruction data comprise details relating to at least one portion of the insured objects and their association with a risk type and a geographical risk area for a risk group, by virtue of the processor units being controlled such that the processor units respectively calculate elemental damage details for the expected damage as a result of one of the natural catastrophe events on one of the insured objects on the basis of the instruction data provided for them and on the basis of a damage sensitivity function determined by the association between the insured objects and a risk type and a geographical risk area, and by virtue of damage expected for the portfolio being determined on the basis of the elemental damage details which are calculated by the plurality of processor units.

By way of example, the processor units are respectively arranged on a separate server, and the instruction data are transmitted to the relevant processor units via a communication network.

By way of example, the insured objects are respectively arranged in a hierarchic data structure, for example a tree structure, having the hierarchy levels, listed in descending order, portfolio, risk group, geographical risk area and risk type, and also scope-of-coverage type, and the damage sensitivity function to be used is determined on the basis of the risk group, the geographical risk area and the risk type, and the scope-of-coverage type. In addition, the details relating to the insured objects respectively comprise a scope-of-coverage value. The elemental damage details for an insured object are calculated on the basis of its scope-of-coverage value, on the basis of the damage sensitivity function determined for the insured object and on the basis of the data for a natural catastrophe event. The natural catastrophe event to be used for calculating an elemental damage detail is obtained, by way of example, from appropriate identification or presence (i.e. specific data relating to the natural catastrophe event) in the instruction data or on the basis of its presence in a local memory (cache) for the relevant processor unit. The data for the natural catastrophe events are obtained from a (central) database or a local data store, particularly a cache, for the processor unit. By way of example, the natural catastrophe events' data stored locally in the processor units are transmitted to the processor units in the instruction data or in a preparatory separate step. The elemental damage details are aggregated locally in the processor unit to form one or more elemental results or are stored in a database, for example.

Splitting the calculations of elemental damage details over a plurality of processor units allows a reduction in the total computation time which would be needed for just one processor unit to calculate the damage expected for the portfolio. The expected total damage can be calculated by summing (aggregating) the individual elemental damage details. By associating the insured objects with a risk type and a geographical risk area of a risk group, the applicable damage sensitivity function can be determined for the relevant object locally and directly in the processor unit where elemental damage is calculated using an elemental damage detail for the object. Particularly if the damage sensitivity functions are stored in the processor units' local cache, this can save the time for requesting and transmitting the damage sensitivity functions from a network server.

In one variant embodiment, local caches for the processor units are respectively used to store at least one damage sensitivity function, and the instruction data for a respective one of the processor units are provided, together with details relating to insured objects whose associations with a risk type and a geographical risk area respectively determine a damage sensitivity function stored in the local cache. Particularly when using a large number of different damage sensitivity functions which cannot all be stored in the processor units' local cache, e.g. ten thousand or more, the time for requesting and transmitting the damage sensitivity functions can be saved if a processor unit is merely assigned those insured objects for calculation for which the relevant processor unit's local cache stores a damage sensitivity function.

In one variant embodiment, instruction data for the processor units are respectively provided for different subdivisions of the natural catastrophe events, which subdivisions are split over the processor units. By way of example, the various risk areas have partly different natural catastrophe events associated with them. The instruction data are then provided for a respective one of the processor units together with details relating to insured objects for a geographical risk area for which at least one associated natural catastrophe event is assigned in the relevant processor unit, and/or the instruction data are provided for a respective one of the processor units together with details relating to natural catastrophe events which are associated with a risk area for which the relevant processor unit has at least one assigned insured object. In this case, the relevant subdivisions of the natural catastrophe events are respectively stored in one of the processor units, for example, or are transmitted to the processor units together with the details relating to the insured objects in the instruction data. Hence, firstly, the calculation of elemental damage details for different natural catastrophe events are split over a plurality of processor units and secondly, the processor units are respectively assigned merely such insured objects as are located in geographical risk areas for which the natural catastrophe events are relevant. This allows the system or the method to be relieved of the burden of "zero calculations", which involve computation steps being performed for elemental damage details which provide no contribution because the relevant insured object is not in a geographical risk area which is influenced by the natural catastrophe event.

In one variant embodiment, the processor units are respectively used to store at least one portion of the natural catastrophe events in a local cache, and the instruction data are provided for a respective one of the processor units for the purpose of processing using natural catastrophe events which are stored in the processor unit's local cache, i.e. the instruction data are provided together with details relating to insured objects for which elemental damage details need to be calculated using natural catastrophe events stored in the processor unit's local cache. By way of example, identifications for natural catastrophe events stored in the cache are associated with the insured objects in the instruction data, or elemental damage details for all natural catastrophe events stored in the cache are calculated for all insured objects which the instruction data contains. Typically, the number of natural catastrophe events is too great to be stored fully in the processor units' local cache, and it is therefore possible to save the time for requesting and transmitting the data relating to the natural catastrophe events if a processor unit is assigned merely those insured objects for calculation for which the relevant processor unit's local cache stores the data relating to the natural catastrophe events.

In one variant embodiment, the instruction data comprise details for a set of insured objects in the portfolio. Data for the natural catastrophe event which is used for calculating the elemental damage detail are obtained from a data store. In one variant, the data for the natural catastrophe event are respectively obtained from a local memory or cache for the relevant processor unit, and elemental damage details are calculated for each insured object in the received set using each locally stored natural catastrophe event. In an alternative variant, the instruction data comprise details for all insured objects in the portfolio; the data for the natural catastrophe event are obtained from a central database; and a natural catastrophe event which is already used for an insured object is marked accordingly in the database.

In one variant embodiment, instruction data are provided which comprise details relating to the identification of a multiplicity of natural catastrophe events and details relating to the identification of the portfolio, the risk group and risk type and a geographical risk area for an insured object. Calculated elemental damage details or aggregates thereof are stored in association with an insured object.

BRIEF DESCRIPTION OF THE DRAWINGS

An embodiment of the present invention is described below with the aid of an example. The example of the embodiment is illustrated by the following appended figures.

WAYS OF IMPLEMENTING THE INVENTION

Figure 1:
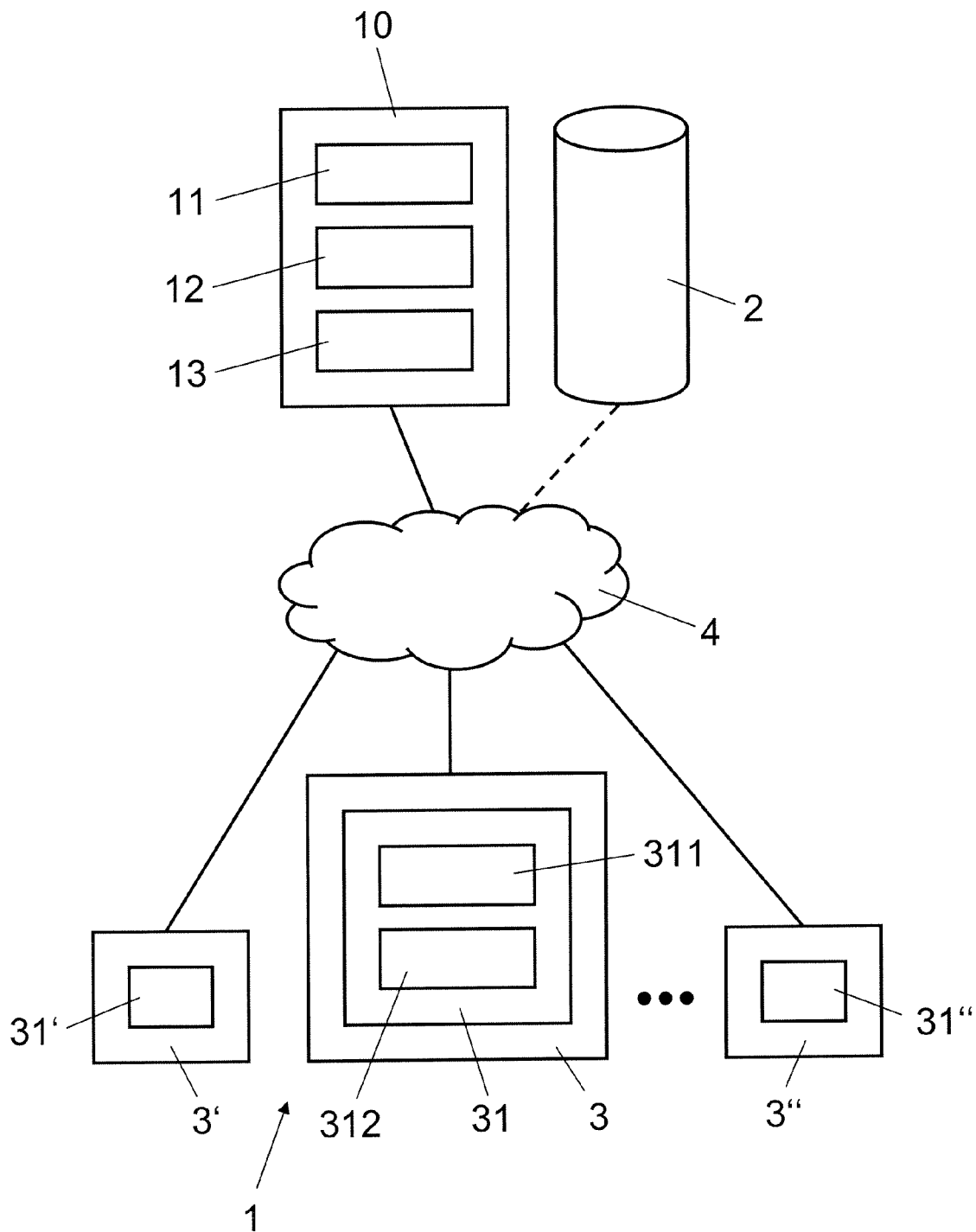
FIG. 1 shows a block diagram, which schematically illustrates a computer-based system which comprises a plurality of networked processor units for calculating damage which is caused by natural catastrophe events.

In FIG. 1, the reference symbol 1 denotes a computer-based system for calculating damage which is caused by natural catastrophe events on insured objects in a defined portfolio.

Figure 2:
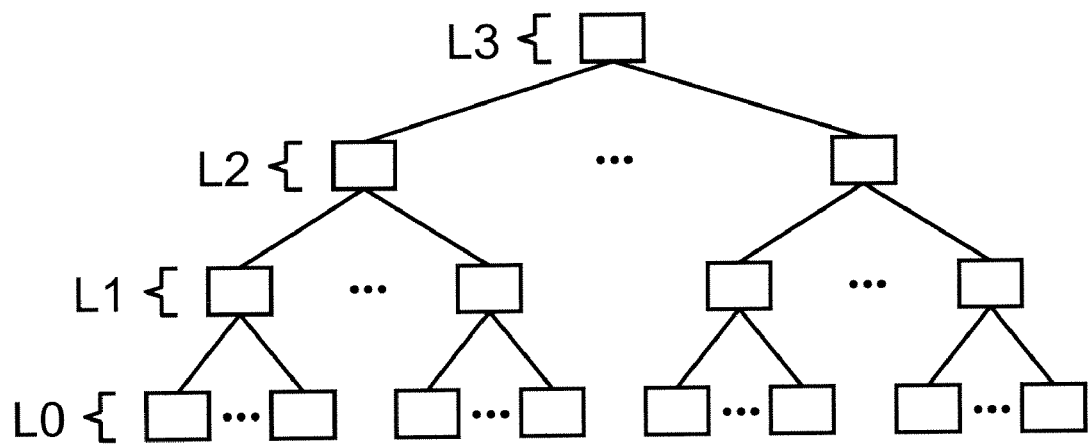
FIG. 2 shows a block diagram which illustrates a data structure for a portfolio of insured objects in which the insured objects are respectively associated with a risk type and a geographical risk area for a risk group.
Figure 3:
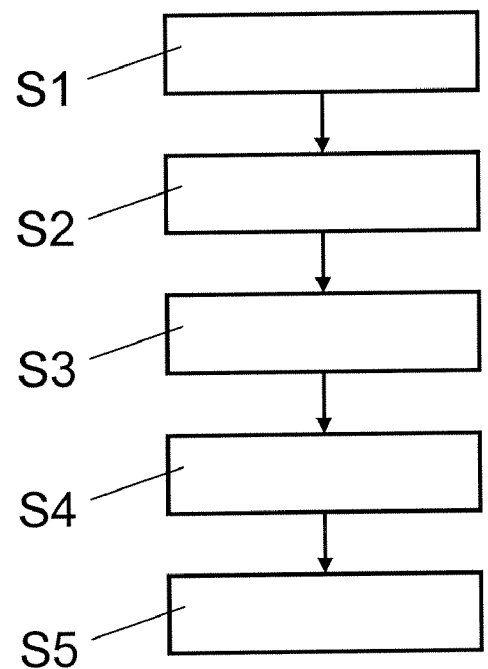
FIG. 3 shows a flowchart which presents an example of a simplified method flow for calculating expected damage on insured objects in a portfolio as a result of natural catastrophe events.

As FIG. 2 shows, the portfolio L3 comprises a plurality of risk groups L2, which cover the threat by one or more natural catastrophes such as storms, floods and earthquakes, for example. Each risk group L2 has a plurality of associated risk units L1, which are respectively defined by a geographical risk area and a risk type. The geographical risk area defines a particular geographical area in which the insured objects are arranged, and the risk type determines a defined category of insured objects, for example single-family houses, multiple-family houses, industrial buildings, etc. Each risk unit L1 has a plurality of associated data elements which respectively define the scope of coverage L0 for an insured object. The scope of coverage L0 determines the scope-of-coverage type, for example, whether the building itself and/or the contents of a building are insured, and the scope-of-coverage value for an insured object. The scope of coverage L0 may also comprise an aggregated scope-of-coverage value which sums the scope-of-coverage values for a plurality of insured objects arranged in a geographical subdivision, for example.

The computer-based system 1 comprises a central database 2 and a computer-based coordination unit 10, which are connected by means of a telecommunications network 4 to a plurality of processor units 31, 31', 31", of which FIG. 1 schematically shows merely three units in simplified form. By way of example, the system 1 comprises 4, 16, 32, 64 or more processor units 31, 31', 31". The database 2 and the coordination unit 10 are implemented on the same computer or on a plurality of different computers.

The database 2 stores data from historical and/or simulated natural catastrophe events for an extended period of several hundred or thousand years. The data for a natural catastrophe event comprise an event identification, an event type, e.g. storm, flood or earthquake, an event location, e.g. coordinates in degrees longitude and latitude, an event level or intensity, and also an event probability or frequency. In addition, the database 2 comprises a multiplicity of damage sensitivity functions which define a damage sensitivity function for the stored events for an insured object on the basis of its risk group L2, its risk area and risk type, and also its scope-of-coverage type. The damage sensitivity functions respectively determine, for an event type, the degree of damage for an insured object on the basis of the event level or intensity at the location of the insured object. Furthermore, the database 2 is configured to store portfolios L3 for insured objects in line with the data structure shown in FIG. 2. By way of example, an object key from the elements comprising portfolio L3, risk group L2, risk unit L1 and scope-of-coverage type is stored in association with each insured object, as shown in Table 1.

TABLE 1

Details about insured object

| Object key | | | Object | |
|---|---|---|---|---|
| Portfolio L3 | Risk group L2 | Risk unit L1 | Scope of coverage L0 | |
| | | | Scope-of-coverage type | Scope-of-coverage value |

The coordination unit 10 comprises a plurality of functional modules, namely a data structuring module 11, an instruction generator 12 and a damage calculation module 13. The functional modules are preferably in the form of programmed software modules. The computer program code of the software modules is part of a computer program product and is preferably stored in a computer in the coordination unit 10, on a computer-readable data storage medium which is permanently or removably connected to the computer.

The processor units 31, 31', 31" are respectively implemented on a computer-based server 3, 3', 3" and comprise a local data store, particularly a cache 312, i.e. a rapidly accessible buffer store, and a control module 311, which is preferably in the form of a programmed software module.

The functionality of the functional modules of the coordination unit 10 and of the control module 311 are described below with reference to FIG. 2, which gives a simplified illustration of the method flow for calculating expected damage on the insured objects in the portfolio L3 as a result of natural catastrophe events defined in the database 2. Aggregated expected damage on the insured objects in a portfolio is determined on the basis of elemental damage which is respectively caused by a natural catastrophe event on an insured object. The elemental damage details for such elemental damage is calculated in distributed fashion in the processor units 31, 31', 31". Elemental damage or an elemental damage detail is calculated on the basis of the damage sensitivity function and the scope-of-coverage value for the relevant insured object, with the damage sensitivity functions determining the degree of damage for the insured object on the basis of the level or intensity of the natural catastrophe event at the location of the insured object.

In step S1, the data structuring module 11 associates the insured objects, which are read from a portfolio file, for example, in each case in line with the type of insurance, with the scope of liability, the object type and the object location for a risk group L2, with a geographical risk area, risk type and a scope-of-coverage type.

In step S2, the instruction generator 12 provides instruction data for the processor units 31, 31', 31" in order to split details about the natural catastrophe events and/or the insured objects for calculating the elemental damage over the processor units 31, 31', 31", with the subsequently described optimization steps being performed in order to achieve even distribution of the calculation of the elemental damage over the processor units 31, 31', 31" and to keep down the total computation time.

If the damage sensitivity functions which are relevant for the portfolio cannot all be stored in the cache 312 for the processor units 31, 31', 31", or if more than one particular share of the cache is required for this, the damage sensitivity functions are at least in part split over the processor units 31, 31', 31" in various damage sensitivity sets. The damage sensitivity functions are split in the instruction data or are split in a separate step by transmitting the damage sensitivity functions to the processor units 31, 31', 31" for storage in the local cache 312. Since the damage sensitivity functions for an insured object are respectively determined on the basis of its object key, the details about the insured objects, particularly the association shown in Table 1 between the object key and the scope-of-coverage value, are inserted into the various instruction data for processor units 31, 31', 31" in line with the split of the damage sensitivity functions. That is to say, the insured objects are, as illustrated schematically by step S21 in FIG. 4, respectively assigned to a processor unit 31, 31', 31" which stores the damage sensitivity function for the insured object in the cache 312. In this case, the damage sensitivity functions or the insured objects are split such that each processor unit, 31, 31', 31", is assigned the most even number of objects possible in order for the elemental damage calculation to be distributed as evenly as possible over the processor units 31, 31', 31".

Figure 4:
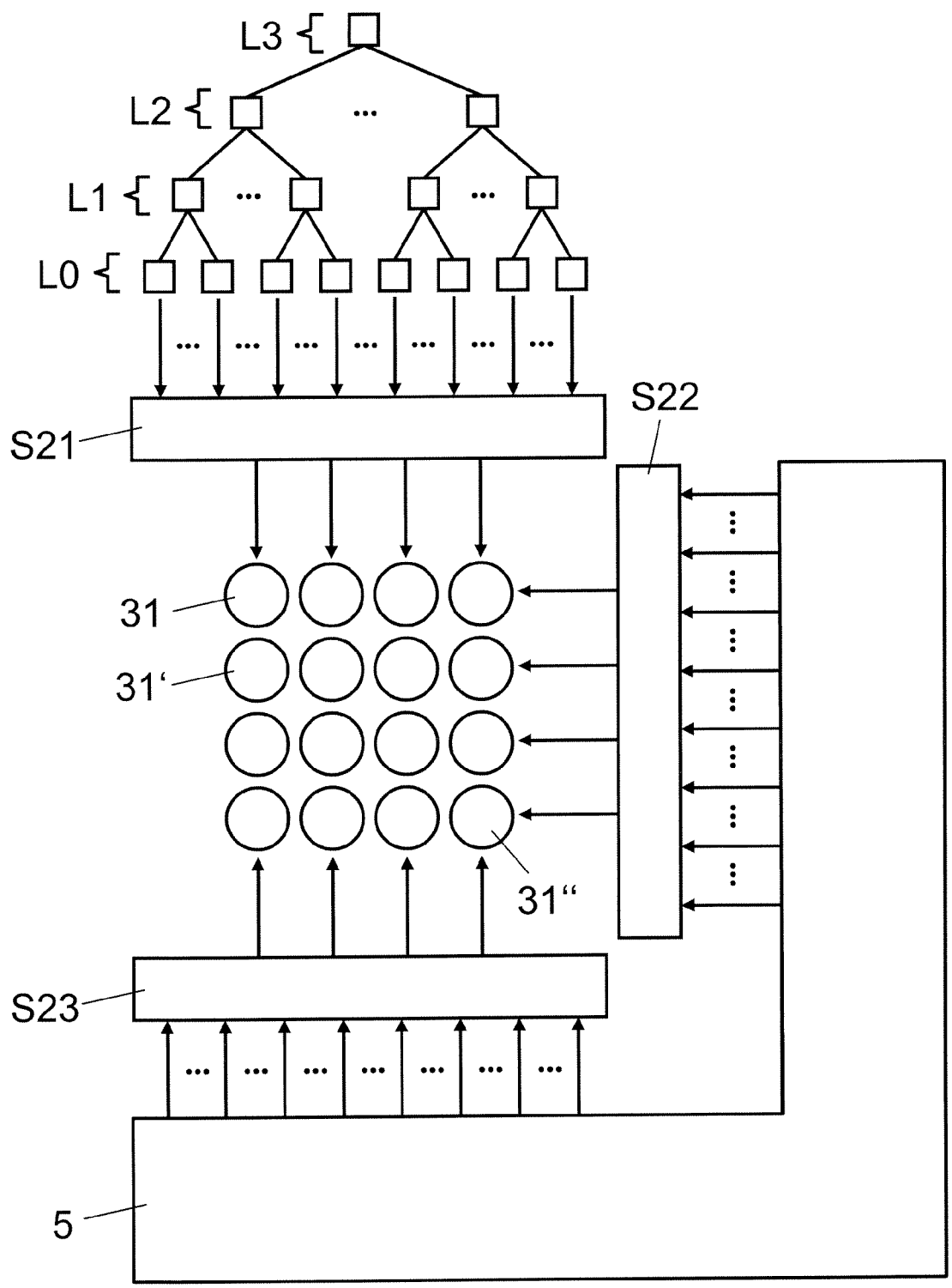
FIG. 4 shows a block diagram which schematically illustrates insured objects in a portfolio and natural catastrophe events which are split over various processor units.

If the damage sensitivity functions which are relevant for the portfolio L3 can all be stored in the cache 312 for the processor units 31, 31', 31" or if a respective plurality of processor units 31, 31', 31" are available for processing the various damage sensitivity sets, then different subdivisions of the natural catastrophe events 5 are split over the processor units 31, 31', 31", as illustrated schematically by step S22 in FIG. 4. The natural catastrophe events are split in the instruction data, or this is done in a separate step by transmitting the natural catastrophe events for storage in the local cache to the processor units 31, 31', 31". The instruction data have the data for the selected natural catastrophe events or at least their event identifiers inserted in them. The natural catastrophe events are in turn split over the processor units 31, 31', 31" such that the elemental damage's calculation is distributed as evenly as possible over the processor units 31, 31', 31". In one variant embodiment, no details relating to the natural catastrophe events are transmitted to the processor units 31, 31', 31" in the instruction data, but rather the control modules 311 of the processor units 31, 31', 31", in each case after the calculation of the elemental damage which is caused by a natural catastrophe event on the assigned insured objects, request the data relating to another natural catastrophe event which has not yet been taken into account from the database 2. The data for a natural catastrophe event which have been obtained from a processor unit 31, 31', 31" are accordingly marked as processed in the database 2. If the processor units 31, 31', 31" have different assigned groups of insured objects, this takes account of the group for which a natural catastrophe event has already been taken into account. In these variant embodiments the natural catastrophe events are therefore split over the processor units 31, 31', 31" dynamically.

If various risk areas have different associated natural catastrophe events, that is to say, if at least one portion of the natural catastrophe events is not relevant for certain risk areas, then the instruction data are provided such that the processor units 31, 31', 31" are assigned, as far as possible, no combinations of insured objects with natural catastrophe events which are irrelevant in this respect. Particularly if the damage sensitivity functions and, accordingly, the insured objects to be processed are split over the processor units 31, 31', 31", the processor units 31, 31', 31" are respectively assigned only those natural catastrophe events 5 which are relevant for the insured objects assigned to the processor units 31, 31', 31" in question, as illustrated schematically by step S23 in FIG. 4. The instruction data are provided for processor units 31, 31', 31" together with details relating to insured objects which are associated with a geographical risk area for which at least one relevant natural catastrophe event is assigned in the relevant processor unit 31, 31', 31". If the details relating to the natural catastrophe events are transmitted to the processor units 31, 31', 31" in the instruction data, the instruction data for the processor units 31, 31', 31" are provided together with details relating to natural catastrophe events which are relevant for at least one insured object which is assigned to the processor unit 31, 31', 31" in question, i.e. natural catastrophe events which are associated with a risk area for which the processor unit 31, 31', 31" in question has at least one assigned insured object. In the case of the variant embodiments with dynamic splitting of the natural catastrophe events, the next natural catastrophe event in the database 2 is chosen from a group of natural catastrophe events relevant for insured objects which are assigned to the requesting processor unit 31, 31', 31".

Preferably, the data relating to the natural catastrophe events required locally in the processor units 31, 31', 31" are respectively stored in a local memory, particularly in the cache 312 for the relevant processor unit 31, 31', 31". The insured objects are respectively assigned to a processor unit 31, 31', 31" which has stored at least one natural catastrophe event relevant for the object in question in the cache 312. The instruction data are thus provided for the processor units 31, 31', 31" together with details relating to insured objects for which the local cache 312 for the processor unit 31, 31', 31" stores relevant natural catastrophe events. Data relating to natural catastrophe events which are not available in a local data store need to be obtained from the central database 2 by means of event identification, for example.

Weighting factors or priority values, for example, influencing the order and/or applicability of the optimization steps described above, can be assigned to said optimization steps on the basis of empirical values regarding different portfolio sizes, the number or period of natural catastrophe events taken into account, the size of the local caches and/or the number and performance of the available processor units 31, 31', 31", so that a suitable split for the natural catastrophe events and the insured objects over the processor units 31, 31', 31" is automatically determined for different scenarios.

In step S3, the instruction generator 12 transmits the instruction data provided to the relevant processor units 31, 31', 31" via the communications network 4.

In step S4, the control module 311 in the processor units 31, 31', 31" respectively calculates the elemental damage or elemental damage details for the assigned insured objects on the basis of the instruction data received. To calculate the elemental damage, the object key is respectively taken as a basis for determining the damage sensitivity function for the insured object in question. For each assigned insured object, the elemental damage is calculated which, depending on the variant embodiment, is obtained from the natural catastrophe events which are stored in the cache 312 or another local data store, which are transmitted in the instruction data which are determined on the basis of event identifications in the instruction data and are explicitly associated with one or more insured objects, for example, and/or which are obtained dynamically from the database 2 without predefined association. The control module 311 aggregates the elemental damage details for the insured objects, for the risk units L1 defined by risk area and risk type and/or for the risk groups L2. The aggregated elemental damage details are stored in the database 2.

In step S5, the damage calculation module 13 takes the aggregated elemental damage details and calculates the damage expected for the entire portfolio L3.

The invention claimed is:

1. Computer-based system for calculating expected damage as a result of natural catastrophe events on a multiplicity of insured objects in a portfolio, comprising:
   a plurality of processor units, each having a control module configured to control the respective processor unit;
   a coordinating unit having a data structuring module configured to associate the insured objects with a risk type and a geographical risk area for a risk group,
   an instruction generator configured to provide instruction data for a respective one of the processor units, and a damage calculation module configured to determine expected damage for the portfolio on the basis of elemental damage details for expected damage as a result of natural catastrophe events on the insured objects, wherein
   the instruction data includes details relating to at least a portion of the insured objects and the association of the insured objects with the risk type and the geographical risk area for the risk group,
   the processor units determine a damage sensitivity function to be used on the basis of the association included in the instruction data and calculate the elemental damage details for expected damage as a result of one of the natural catastrophe events on one of the insured objects based on the instruction data and the determined damage sensitivity function for the insured object, the processor units store at least one damage sensitivity function in a local cache, and the instruction generator provides the instruction data and details relating to the insured objects having associations with a risk type and a geographical risk area that determine one of the damage sensitivity functions stored in the local cache.

2. System according to claim 1, wherein the instruction data includes data relating to the natural catastrophe events or event identifiers and the instruction generator is configured to provide the instruction data to the processor units to split the natural catastrophe events between the processor units.

3. System according to claim 2, wherein geographical risk areas have associated natural catastrophe events, and the instruction generator is configured to provide the instruction data to a respective one of the processor units together with details relating to insured objects associated with a geographical risk area for which at least one associated natural catastrophe event is stored in the processor unit.

4. System according to claim 1, wherein geographical risk areas have associated natural catastrophe events, and the instruction generator is configured to provide the instruction data for a respective one of the processor units together with details relating to natural catastrophe events which are associated with a geographical risk area for which the processor unit has at least one insured object stored thereon.

5. System according to claim 1, wherein the processor units respectively store at least one portion of the natural catastrophe events in a local cache of the respective processor unit, and the instruction generator is configured to provide the instruction data for a respective one of the processor units together with details relating to insured objects for which elemental damage details are to be calculated using natural catastrophe events stored in the local cache of the processor unit.

6. System according to claim 1, wherein the instruction data comprise details for a set of the insured objects in the portfolio, and the control modules are configured to obtain data for the natural catastrophe event used for the elemental damage detail calculation from a data store.

7. System according to claim 1, wherein the data structuring module is configured to arrange the insured objects in a respective hierarchical data structure having hierarchy levels comprising, in descending order, portfolio, risk group, geographical risk area and risk type, and scope-of-coverage type, and the control modules are configured to determine the damage sensitivity function to be used on the basis of the risk group, the geographical risk area and the risk type, and the scope-of-coverage type.

8. System according to claim 1, wherein the instruction generator is configured to provide instruction data which comprise details relating to identification of a multiplicity of natural catastrophe events and details relating to identification of the portfolio, the risk group and the risk type and the geographical risk area for an insured object, and the control modules are configured to store calculated elemental damage details in association with an insured object.

9. System according to claim 1, wherein the processor units and the instruction generator are respectively arranged on a separate server; the control modules are respectively arranged on the server with the processor unit to be controlled, the instruction generator is configured to transmit the instruction data via a communication network to the relevant processor units; the system comprises a database storing data for the natural catastrophe events; the control modules are configured to obtain the data for the natural catastrophe events from the database when the data is not stored in a local cache for the processor unit; the details relating to the insured objects respectively comprise a scope-of-coverage value; the control modules are configured to calculate the elemental damage details for an insured object on the basis of the scope-of-coverage value of the insured object, the damage sensitivity function determined for the insured object and the data for a natural catastrophe event indicated in the instruction data; and the control modules are configured to store the calculated elemental damage details in the database.

10. A computer-implemented method for calculating expected damage as a result of natural catastrophe events on a multiplicity of insured objects in a portfolio, comprising:

associating the insured objects with a risk type and a geographical risk area for a risk group;

providing instruction data for a plurality of processor units, wherein the instruction data comprise details relating to at least a portion of the insured objects and the association of the insured object with the risk type and the geographical risk area for the risk group;

controlling the processor units by a respective one of a plurality of control modules such that the processor units respectively determine a damage sensitivity function to be used based on the association between the insured objects and the risk type and the geographical risk area, and respectively calculate elemental damage details for the expected damage as a result of one of the natural catastrophe events on one of the insured objects on the basis of the instruction data provided and the determined damage sensitivity function, wherein the processor units store at least one damage sensitivity function in a local cache, and the instruction generator provides the instruction data and details relating to the insured objects having associations with a risk type and a geographical risk area that determine one of the damage sensitivity functions stored in the local cache; and determining expected damage for the portfolio based on the elemental damage details.

11. Method according to claim 10, wherein the instruction data includes data relating to the natural catastrophe events or event identifiers and the instruction data for the processor units are respectively provided to the processor units to split the natural catastrophe events between the processor units.

12. Method according to claim 10, wherein geographical risk areas are allocated and associated with natural catastrophe events, and the instruction data are provided for a respective one of the processor units together with details relating to insured objects associated with a geographical risk area for which at least one associated natural catastrophe event is stored in the processor unit.

13. Method according to claim 10, wherein geographical risk areas are allocated and associated with natural catastrophe events, and the instruction data are provided for a respective one of the processor units together with details relating to natural catastrophe events which are associated with a geographical risk area for which the relevant processor unit has stored thereon at least one insured object.

14. Method according to claim 10, wherein the processor units are respectively used to store at least one portion of the natural catastrophe events in a local cache, and the instruction data are provided for a respective one of the processor units together with details relating to insured objects for which elemental damage details need to be calculated using natural catastrophe events stored in the local cache for the processor unit.

15. Method according to claim 10, wherein the instruction data comprise details for a set of insured objects in the portfolio, and data for the natural catastrophe event used for calculating the elemental damage detail are obtained by the processor unit from a data store.

16. Method according to claim 10, wherein the insured objects are respectively arranged in a hierarchical data structure having hierarchy levels comprising, in descending order, portfolio, risk group, geographical risk area and risk type, and scope-of-coverage type, and the damage sensitivity function to be used is determined on the basis of the risk group, the geographical risk area and risk type and the scope-of-coverage type.

17. Method according to claim 10, wherein instruction data are provided which comprise details relating to the identification of a multiplicity of natural catastrophe events and details relating to the identification of the portfolio, of the risk group and of the risk type and of a geographical risk area for an insured object, and calculated elemental damage details are stored in association with an insured object.

18. Method according to claim 10, wherein the processor units are respectively arranged on a separate server; the instruction data are transmitted via a communication network to the relevant processor units; data for the natural catastrophe events are stored in a database; the processor units obtain the data for the natural catastrophe events from the database when they are not stored in a local cache for the processor unit; the details relating to the insured objects respectively comprise a scope-of-coverage value; the elemental damage details for an insured object are calculated on the basis of the scope-of-coverage value for the insured object, the damage sensitivity function determined for the insured object and the data for a natural catastrophe event indicated in the instruction data; and the calculated elemental damage details are stored in the database.

* * * * *